United States Patent

[11] 3,618,709

| [72] | Inventor | Wallace G. Boelkins |
|---|---|---|
| | | Grand Rapids, Mich. |
| [21] | Appl. No. | 874,508 |
| [22] | Filed | Nov. 6, 1969 |
| [45] | Patented | Nov. 9, 1971 |
| [73] | Assignee | Uni-Mist, Inc. |
| | | Grand Rapids, Mich. |

[54] PRESSURIZED LUBRICATION SYSTEM
11 Claims, 4 Drawing Figs.

[52] U.S. Cl. ................................................. 184/6.4,
137/595, 184/55, 184/81
[51] Int. Cl. ..................................................... F16n 7/30
[50] Field of Search .......................................... 137/595;
184/7 C, 7, 6 D, 6 Z, 1 E, 1 C, 81, 55

[56] References Cited
UNITED STATES PATENTS

| 2,461,076 | 2/1949 | Neeson | 184/6 X |
| 2,676,315 | 4/1954 | Kyle | 184/6 D UX |
| 3,472,277 | 10/1969 | Reinicke et al. | 137/595 |
| 3,478,843 | 11/1969 | Eckardt | 184/6 Z |

FOREIGN PATENTS

| 532,050 | 10/1956 | Canada | 184/6 Z |

Primary Examiner—Manuel A. Antonakas
Attorney—Price, Heneveld, Huizenga & Cooper ABSTRACT: A pressurized lubrication system having a source of air under pressure coupled to a container which holds a quantity of lubricating liquid under a volume of pressurized air, with a metering valve and a check valve in the air line connecting the air source to the pressurized container, and with separate air and lubricant lines extending from the pressurized container to a manifold. The air and lubricant lines each contain a valve, both of which are controlled by a single solenoid, and the solenoid is in turn controlled by a pressure switch operatively connected with the pressurized container to activate the solenoid when the pressure in the container reaches a predetermined high level and to deactivate the solenoid when the pressure in the container reaches a lower predetermined level. The manifold at the end of the air and lubricant lines has metering valves for separately metering the rate of flow of air and lubricant through each of a plurality of coaxial tubes extending outwardly from the manifold, and each of said coaxial tubes have an applicating nozzle at the end thereof.

PATENTED NOV 9 1971 3,618,709

INVENTOR.
WALLACE G. BOELKINS
BY Ogies, Heneveld
Huizenga & Cooper
ATTORNEYS

PRESSURIZED LUBRICATION SYSTEM

BACKGROUND

A vast multitude of industrial operations require some type of cooling or lubricating system in order to keep machines and tools running smoothly. The present invention relates to a system which can be utilized wherever there is a need for supplying a liquid or a liquid mist to a given point such as a lubricating point, particularly from a common lubrication system.

In many operations and machines there is no need for a constant flow of liquid or of a liquid mist to a given lubrication point. Rather, an intermittent flow is desired. For example, in lubrication systems which are associated with industrial machinery, the activation of the lubrication system is usually controlled by the working cycle of the machine to be lubricated.

SUMMARY

In the present invention, pressurized air (or gas) is supplied to a container which holds both a quantity of liquid and a quantity of the air under pressure. The air is supplied to the container through a metering means such that the rate of flow of the air from the air supply means to the pressurized container can be regulated. Means are provided for allowing air to flow from the pressurized container to a lubrication point, such means including a valve for regulating the flow of the air. Means are also provided for allowing liquid to flow from said pressurized container to the lubrication point, such means also including a valve for regulating the flow of the liquid. Finally, there is a means for controlling both of said valves as a function of the air pressure in the pressurized container.

Thus the invention provides a lubricating system which is universal in application and which is not tied to the operation cycle of a single machine. Rather, the frequency of lubrication of the present system can be varied by adjusting the airflow metering valve and the means for controlling the valves on the air and lubricant lines which flow from the pressurized container to the lubrication point. DRAWINGS The above-mentioned advantages and other advantages of this invention can be seen by reference to the drawings wherein.

PREFERRED EMBODIMENT

Figure 1:
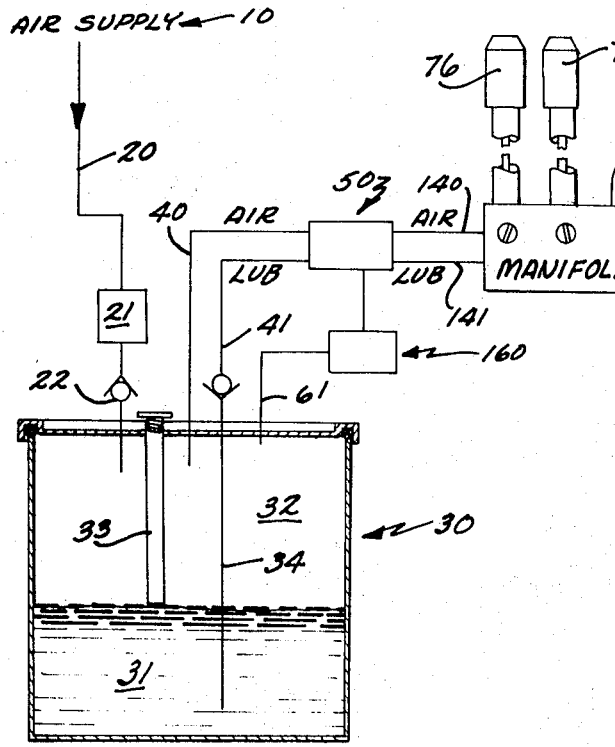
FIG. 1 is a schematic drawing of the overall pressurized lubrication system.

The basic components of the system of this invention include supply or source 10 of air under pressure, an air supply line 20 including a metering valve 21 and a check valve 22, a pressurized container 30, an outlet air line 40, an outlet line 41 for liquid or lubricant, a double valve means 50 for controlling the flow through lines 40 and 41, a pressure switch 60, and a metering valve manifold 70 having coaxial tubes 73 extending therefrom.

The air supply means 10 may generally be a central air compressor which supplies pressurized air for a number of purposes. While any suitable gas could be used in the system, compressed air is the most typical medium, and is convenient and readily available. Air supply line 20 connects the air supply means 10 to the container 30, to pressurize it. Metering valve 21 in line 20 is a pressure-regulating device of a conventional nature and should be adjustable to provide any desired rate of flow of air into the pressurized container 30 to maintain it at a desired pressure level. Check valve 22 in air supply line 20 prevents air from flowing from pressurized container 30 back to air source 10.

Pressurized container 30 may be any suitable container for holding a liquid lubricant 31 and air 32 under pressure. There should be a safety valve on this container and an inlet tube 33 or other such means for admitting the liquid 31. Inlet tube 33 extends into the container a predetermined distance to maintain a desired volume of lubricant therein, as well as a desired volume of compressed air above the lubricant. Extending out of the pressurized container 30 are an air line 40 and a lubricant line 41. Lubricant line 41 extends well below the level of liquid 31 in pressurized container 30, as for example by means of a sump tube 34 connected to the cover of the container and having an appropriate connection to lubricant line 41. Likewise, there is a shorter tube extending just inside the cover of the container with an appropriate connection to air line 40.

Figure 2:
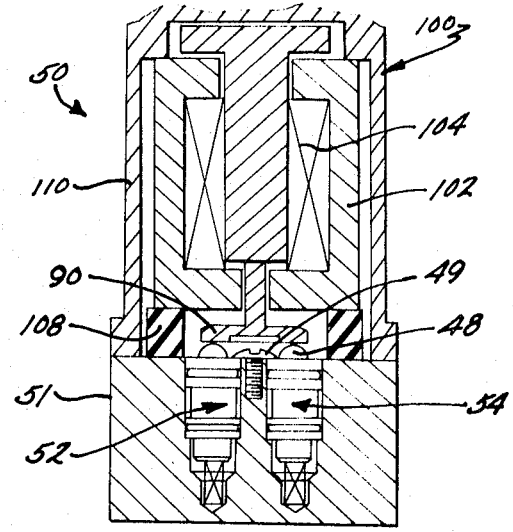
FIG. 2 is a sectional end elevation of the solenoid control valve means used in the system of FIG. 1.
Figure 3:
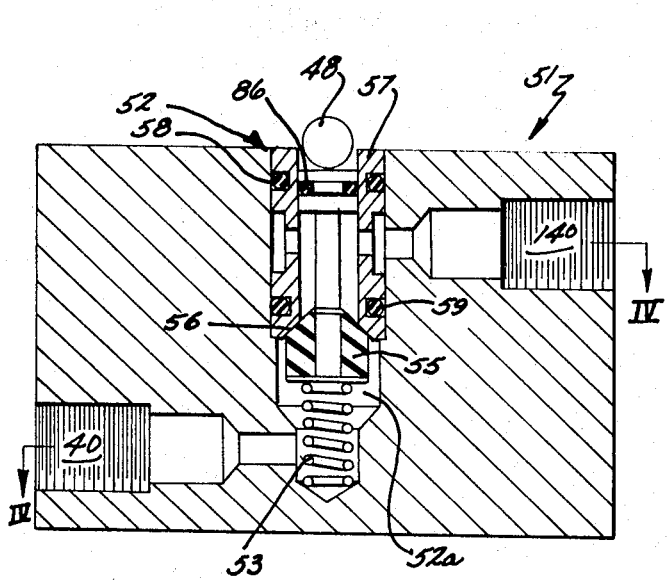
FIG. 3 is an enlarged sectional side elevation of the valve portion of the valve means shown in FIG. 2.
Figure 4:
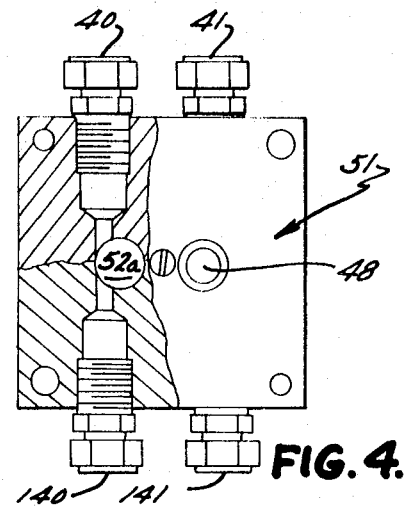
FIG. 4 is a fragmentary sectional overhead plan view on a reduced scale, taken through the plane IV—IV of FIG. 3.

Lines 40 and 41 both lead to a solenoid-operated double valve means 50, which includes a valve block 51 (FIGS. 2, 3 and 4) having a pair of separate valve members 52 and 54 for controlling the flow through air line 40 and lubricant line 41, respectively, to their respective outward extensions 140 and 141, which connect to the aforementioned manifold 70, or a series of such manifolds. A description of valve 52 will suffice for both, since both are of an identical construction. Line 40 leads into the valve block 51 (FIGS. 3 and 4) and into the lower portion of a valve chamber 52a which is opened and closed by valve 52, while outlet 140 leads out of block 51 from the upper portion of chamber 52a. A spring 53 in the bottom of valve chamber 52a acts to force a valve plunger 152 upwardly, in conjunction with the upwardly directed force applied to such member by the pressure of the fluid which is controlled thereby. Plunger 152 has a resilient end 55 at its lower extremity which is flat on the bottom and of a larger diameter than the spring 53, and which lies in contact with the latter. End portion 55 has a conical top which slopes upwardly and inwardly at about 45° to the horizontal, and which seats in a conical bore 56. Valve 52 also includes an O-ring plunger seal 86 which prevents fluid from flowing out through the top of the valve member. Plunger 152 slides vertically inside a tubular sleeve insert 57 which includes O-ring seals 58 and 59 at its top and bottom portions, respectively, such that neither air nor lubricant can leak out of the valve through its top or out of the upper portion of the valve and into the lower portion thereof. The sleeve 57 generally rests snugly against the walls of the generally cylindrical bore or chamber 52a, but it has a reduced diameter about that portion which is laterally aligned with outlet line 140. Furthermore, there are several ports through the reduced diameter portion of the sleeve, such that outlet 140 communicates with the interior of the sleeve and with plunger 57. The lowermost extremity of the tubular sleeve forms the aforementioned conical seat 56 in which the resilient end 55 of plunger 152 seats to shut off flow through the valve chamber. As illustrated in FIG. 2 both valves 52 and 54 may be retained in place by a screw 49 which is screwed into block 51 and whose head extends over the edge of the sleeve inserts of both valves, thus holding them in place. A free actuating ball 48 is then placed on top of the plunger of each valve when the latter are to be solenoid or manually activated.

One preferred means for actuating valves 52 and 54 is seen by reference to FIG. 2. A ganging means including a circular plate 90 rests atop both of the balls 48 and has a post extending upwardly into a solenoid 100. Solenoid 100 includes a core 102, a winding 104 within the latter, an armature 106 encircled by winding 104, rubber core mount 108, and an outer housing 110. Armature 106 is I-shaped, and the horizontal portion thereof is outside of an above both winding 104 and core 102. Core 102 supports winding 104 and rests atop the rubber mounts 108. Solenoid housing 110 is mounted on top of valve block 51, and contacts the top of the core 102 to push the latter downwardly against the resilient mounts 108. There is a space defined between the top of housing 110 and winding core 102 which is sufficiently large to accommodate the horizontal portion of the T-shaped armature 106, and large enough to accommodate the stroke of the latter when the solenoid is energized.

When winding 104 is energized to actuate solenoid 100, armature 106 is pulled downwardly, thereupon pushing downwardly on gang plate 90 which in turn pushes downwardly on the valve-actuating balls 48. The latter in turn push downwardly on the plungers of both valves 52 and 54, opening them. There is a slight recess in gang plate 90 to accommodate the head of screw 49 when the gang plate is pushed downwardly. The use of balls 48 rather than a member rigidly connected to gang plate 90 provides a self-aligning operation and prevents any binding up of plunger 152 with insert 57 due to any slight misalignments of the solenoid armature or ganging plate with respect to the valve members in the repeated operation of the solenoid. When solenoid housing 110 is secured tight on valve block 51, valves 52 and 54 will be opened to their maximum possible extent when the solenoid is actuated. However, because the mounts 108 are somewhat resilient, housing 110 can be mounted on the valve block with a small and variable amount of clearance therebetween, such that the extent to which valves 52 and 54 will be opened when solenoid 100 is activated will be somewhat less than the maximum amount possible. Gang plate 90, and the overall configuration and nature of valve 50 thus makes it possible to open both valves 52 and 54 simultaneously, by a single actuating signal, and it does so by a simple and relatively inexpensive component.

In connection with the means for actuating valves 52 and 54, it is to be noted that instead of a solenoid or like control component which operates a mechanical ganging means, such as is discussed in the preceding paragraph, it is also quite possible to merely use controlled air pressure to depress the valve plungers. In this instance, the solenoid 100 and ganging plate member 90, and the balls 48 are not required. Instead, an upper housing (not shown) is provided for the valves which defines a closed air chamber immediately above the plungers, with a chamber shape which may closely approximate the shape of the ganging plate member 90. With such an apparatus, the admission of pressurized air into the chamber, through an appropriate inlet therein, will simultaneously force the plungers downwardly, while the release of such air pressure will result in the immediate reseating or closing of the valve plungers.

In the system of the invention, the solenoid 100 (or the control member for the pressurized air of the system just described), and thereby the entire valve means 50, is controlled by a pressure switch 60 which is operably connected by an air line 61 to pressurized container 30 (FIG. 1). Thus, the operation of switch 60, and of the valve 50, is a function of the pressure in the container 30, and which 60 can be adjusted to activate at any desired pressure within a given range. Furthermore, switches of this nature are readily available which have a lag in their operation, and which deactivate at a lower pressure than that at which they actuate, Also, such switches are obtainable with a variable lag, and switch 60 is preferably of the latter type.

After leaving the valve means 50, pressurized air passes through line 140, and pressure-forced lubricant through line 141, to metering valve manifold 70 (FIG. 1). Such a device is disclosed and claimed in U.S. Pat. No. 3,050,083, issued to C. J. Verway on Aug. 21, 1962, and owned by the assignee of the present invention. Generally, such a device has any number of double tube means, preferably coaxial tubes 73, leading from it which can supply lubricant or a lubricant mist through a nozzle 76 to various lubrication points. Each coaxial tube 73 preferably comprises an inner rubber or plastic tube 74 for carrying liquid to the nozzle 76 and an outer tube 75 of copper or the like, for carrying air to the nozzle 76. Adjustable metering screws or valves 71 meter the flow of liquid through passages in the manifold and out of tube 74, and a similar adjustable metering screw or valve, (not shown in the drawing) on the opposite side of the manifold meters the flow of air through the manifold and out of outer tube 75.

OPERATION

In operation air flows from the air supply source 10 into pressurized container 30 at a rate which is predetermined and controlled by adjustment of a metering valve 21. Pressure switch 60 is set to activate and complete a circuit to solenoid 100 at a particular predetermined pressure level. When the pressure in container 30 reaches that level, pressure switch 60 is activated and allows electrical current to flow to winding 104 of solenoid 100, which is activated and forces its armature 106 and the gang plate 90 downward. This in turn forces plungers 152 of valves 52 and 54 downward, allowing air to flow through valve 52 and lubricant to flow through valve 54. Lubricant flows to the metering valve manifold 70 and to the nozzles 76 through the inner tubes 74 of coaxial tubes 73. If a spray or mist-type system is not required, the nozzles 76 are not necessary, and the lubricant can be directed through its tube directly to the lubrication point, Where a mist application is required, air flows to metering valve manifold 70 and to nozzles 76 through the outer tubes 75 of coaxial tubes 73. At each nozzle 76, air and lubricant will form a lubricant mist which will spray outwardly from the nozzles. The rate of flow of lubricant through each nozzle can be varied by use of the adjusting valve 71. The rate of flow of air through a given nozzle 76 can be varied by adjusting the appropriate valve on the other side of the metering valve manifold 70. If desired, the flow of air to any lubrication point can be completely eliminated by completely closing the appropriate metering valve or valves. In such a case, the system would be applying lubricant under pressure, rather than a lubricant mist.

As air and lubricant flow from the container 30 through double valve means 50, the pressure in container 30 will begin to drop. When it reaches a predetermined low level, the pressure switch 60 will deactivate. As suggested previously, the latter pressure level is predetermined by either the set lag of the particular pressure switch 60, or if the appropriate type of switch 60 is used, by adjusting the lag to a desired level. When the pressure switch 60 deactivates, it will open the electrical circuit to the solenoid 100, which will likewise deactivate. This allows the springs 53 to seat their respective valve member 56 and thus close both valves 52 and 54, forcing gang plate 90 and armature 106 upwardly. The flow of air through air line 40 and the flow of lubricant through lubricant line 41 is then shut off. In the meantime, air will continue to flow from the air supply means to pressurized container 30, at the predetermined rate established by metering valve 21. Thus, the pressure in the pressurized container will once again begin to build up and will eventually reach a level which will activate pressure switch 60. Thus, the process of opening and closing the valves 52 and 54 of double valve means 50 will be repeated, and the supply of lubricant and pressurized air will be of a pulsating nature.

The frequency of this pulsating repetition can be varied by either adjusting the metering valve 21, or the pressure switch 60, or both. By making these adjustments, one can make a single lubrication system of uniform construction adaptable to any number of machines or operations which require lubrication. The need for a lubrication system which is custom engineered to a particular machine or operation is therefore eliminated.

It is understood that the above disclosure is merely a preferred embodiment of this invention, and that a number of changes and modifications can be made on this disclosure without departing from the broader aspects of the invention.

The embodiments of the invention in which an exclusive property or privilege is claimed are defined as follows.

1. A pressurized lubrication system, comprising in combination: a source of gas under pressure; an container for holding a volume of gas under pressure and a quantity of liquid pressurized by said gas volume; means for allowing gas to flow from said source to said container, said means including metering means for regulating such gas flow; conduit means for directing gas to flow from the volume thereof in said container to a lubrication point, said means including a first valve means for controlling such gas flow; conduit means for directing liquid to flow from said quantity thereof in said container to said lubrication point under the force of said gas volume, said means including a second valve means for controlling such liquid flow; and control means for operating both of said first and second valve means in response to the amount of pressure in said container, to open said first and second valve means when the pressure in said container exceeds a predetermined level and to close said valve means when the pressure in said container is lower than said level.

2. A pressurized lubrication system as in claim 1, wherein said conduit means for directing gas and liquid flow from said pressurized container to said lubrication point includes metering means for regulating at least one of said gas or liquid flow when said first or second valve means are open.

3. A pressurized lubrication system as in claim 1, wherein said means for controlling said first and second valve means includes a pressure switch operably connected to said pressurized container and at least one solenoid means which is actuated by said pressure switch to open at least one of said first and second valve means when actuated and to close at least one of said first and second valve means when deactuated.

4. A pressurized lubrication system as in claim 2, wherein said means for controlling said first and second valve means includes a pressure switch operably connected to said pressurized container, and at least one solenoid means which is actuated by said pressure switch to open at least one of said first and second valve means when actuated and to close at least one of said first and second valve means when deactuated.

5. The device of claim 2, wherein said metering means for regulating gas or liquid flow from said container to said lubrication point includes a metering valve manifold and at least one double tube means extending therefrom for separately transmitting gas and liquid flow from said manifold to said lubrication point, said double tube means including a gas tube and a liquid tube; said metering valve manifold including at least one adjustable metering valve for regulating flow in said gas tube and at least one metering valve for regulating flow in said liquid tube, such that the flow of gas and liquid through said gas and liquid tubes can be independently regulated.

6. The device of claim 5, wherein said means for controlling said first and second valve means includes a pressure switch operably connected to said pressurized container, and a solenoid means which is actuated by said pressure switch; said solenoid means including an armature and ganging means movable by said armature to open and close each of said first and second valve means in response to movement of said armature upon actuation and deactuation of said solenoid means by said pressure switch.

7. The device of claim 1, wherein said means for controlling said first and second valve means includes a pressure switch operably connected to said pressurized container, and a solenoid means which is actuated by said pressure switch; said solenoid means including an armature and ganging means movable by said armature to open and close each of said first and second valve means in response to movement of said armature upon actuation and deactuation of said solenoid means by said pressure switch.

8. A method for intermittently supplying lubrication to at least one lubrication point, said method comprising: supplying a regulated flow of pressurized gas to a container for holding a volume of such gas and a liquid under the pressure of such gas; coupling the pressurized gas in said container to said lubrication point and controlling gas flow therebetween by a first valve means; coupling the liquid pressurized by the gas in said container to said lubrication point and controlling liquid flow therebetween by a second valve means; sensing the pressure in said pressurized container; and operating said first and second valve means in response to the sensed pressure by opening the latter when the pressure in said pressurized container rises to a predetermined level and closing them when such pressure falls below said predetermined level.

9. The method of claim 8, wherein said step of controlling gas and liquid flow from said pressurized container to said lubrication point includes metering the rate of flow of gas and liquid therebetween.

10. The method of claim 8, wherein said step of opening and closing said first and second valve means in response to the sensed pressure in said container includes activating an electrical switch by a pressure-sensing means, actuating at least one solenoid by means of said switch, and controlling the operation of said valves by said solenoid.

11. The method of claim 10, wherein said step of opening and closing said first and second valve means includes providing at least one solenoid and activating said solenoid when said switch is activated and deactivating said solenoid when said switch is deactivated; and operably connecting said solenoid to at least one includes the step of controlling both of said first and second valve means by a single solenoid unit.

* * * * *